United States Patent
Zheng

[11] Patent Number: 6,148,126
[45] Date of Patent: Nov. 14, 2000

[54] DUAL FIBER OPTICAL COLLIMATOR

[76] Inventor: Yu Zheng, 109 E. Duane Ave., Suite 107, Sunnyvale, Calif. 94086

[21] Appl. No.: 09/167,805

[22] Filed: Oct. 7, 1998

[51] Int. Cl.$^7$ ...................................................... G02B 6/32
[52] U.S. Cl. ................................. 385/34; 385/33; 385/93; 156/65
[58] Field of Search ................................. 385/33, 24, 31, 385/43, 88, 89, 90, 91, 93; 156/64, 330

[56] References Cited

U.S. PATENT DOCUMENTS

| | | |
|---|---|---|
| 4,868,521 | 9/1989 | Mallinson .................................. 385/33 |
| 6,019,522 | 2/2000 | Kim ........................................ 385/33 X |
| 6,023,542 | 2/2000 | Pan et al. ................................ 385/33 X |

*Primary Examiner*—Phan T. H. Palmer
*Attorney, Agent, or Firm*—Bo-In Lin

[57] ABSTRACT

This invention discloses a dual-fiber optical collimator. The collimator includes a dual fiber pigtail and a GRIN lens wherein the dual fiber pigtail securely fixed to the GRIN lens by a ultraviolet-curing epoxy and a first heat-curing bonding epoxy. The collimator further includes a glass tube securely fixed to the dual fiber pigtail by a second heat-curing bonding epoxy. A stainless steel holder securely fixed to the glass tube by a third heat-curing bonding epoxy. The first, second and third heat-curing bonding epoxy is a heat-curing epoxy of 353ND epoxy. The ultraviolet-curing epoxy applied between the GRIN lens and the dual fiber pigtail is an ultraviolet-curing epoxy of ECI4481 epoxy or an ultravioet-curing epoxy of OG154 epoxy. The stainless steel holder securely fixed to the glass tube by a third heat-curing bonding epoxy is disposed a distance away from the first heat-curing bonding epoxy and the ultraviolet-curing epoxy.

7 Claims, 4 Drawing Sheets

DUAL FIBER OPTICAL COLLIMATOR

BACKGROUND OF THE INVENTION

1. Field of the Invention

This invention relates generally to a method and system for use in optical fiber technology. More particularly, this invention relates to a method and apparatus for manufacturing an improved dual fiber optical collimator.

2. Description of the Prior Art

As optical fiber technology is being more broadly applied in the telecommunications, data communications and CATV industries, the fiber optic component industry is now confronted with increasing requirement for high reliability of fiber optic components. Currently, most of in-line fiber optic components are designed and manufactured based on optical collimators which provide low-loss light transmission from the input fiber to the output fiber through an optical element. As a basic building block of the fiber optic components, the reliability and level of performance of the fiber optic components depend heavily on the reliability and the performance characteristics of the optical collimators. Dual-fiber optical collimators are one type of collimators most widely employed in making the fiber optic components. For example, dual-fiber optical collimators are employed to make thin film filter based wavelength division multiplexers, hybrid optical isolators, and compact optical circulators.

FIG. 1 shows the structure of a typical dual-fiber optical collimator that includes a dual-fiber pigtail, a GRIN lens, a glass tube and a stainless steel holder. In a typical manufacturing process, a GRIN lens 15 and a dual fiber pigtail 30 are mounted on an alignment stage (not shown). The relative position of the GRIN lens 15 and the fiber pigtail 30 is adjusted to achieve a lowest transmission loss between the input fiber 20 and output fiber 25. Then the fiber pigtail 30 is fixed to the GRIN lens 15 at that position by applying an ultraviolet (UV) curing epoxy 35. An example of the UTV curing epoxy is MODEL ELC4481 from ElectrouLnte Company in Danbury, Conn. Then the fiber pigtail 30 is fixed to a glass tube 40 by applying an UV curing epoxy 45 and the glass tube 40 is fixed to a stainless steel holder 50 by a heat-curing epoxy 55. The stainless steel holder is gold-plated and applied for the purpose of soldering. The UV curing epoxy 35 is also filling the gap between the GRIN lens 15 and the stainless steel holder 50. While the method and system provides a dual-fiber optical collimator with good performance and its reliability is suitable for many types of applications until now. The dual-fiber optical collimators manufactured according to the above mentioned method however fail and perform poorly when they are implemented in fiber optic components that demand long term operation in a high temperature, e.g., 85° C., and high humidity, e.g., 85% humidity, environment The UV curing epoxy bonding, e.g, epoxy 35 and 45, are often broken when subject to such operation conditions and then the bond breakage results in poor optical signal transmission. Furthermore, the UV curing epoxy bonding 35 is also often deformed during the soldering process because it is in contact with the stainless steel holder and the soldering temperature is pretty high. This bonding deformation causes significantly poor optical signal transmission. Thus, further development of reliable fiber-optic components with high level of performance is limited by these difficulties.

Therefore, a need still exists in the art of design and manufacture of dual-fiber optical collimators to provide new material compositions, device structure, and manufacture processes to overcome the difficulties discussed above. Specifically, a technique to provide the collimators with higher reliability for long term operation in high temperature and humidity environment is required. Since production costs have been an important contributing factor prohibiting practical implementation of fiber-optical technology, it is also highly desirable that the cost of such technology would be as low as possible.

SUMMARY OF THE PRESENT INVENTION

It is therefore an object of the present invention to provide a new design and process for fabricating a dual-fiber optical collimator with improved reliability capable of sustaining prolong operation cycles in high temperature and high humidity environment without breakdown as well as with improved resistance to soldering. Therefore, the aforementioned difficulties and limitations in the prior art can be overcome.

Specifically, it is an object of the present invention to provide a fabrication process to first adjust and fix the position of a dual-fiber pigtail relative to a GRIN lens then apply a heat-curing epoxy to produce more reliable collimators, The collimators produced by the improved processes can sustain long term operation under high temperature and high humidity conditions. Therefore, the improved collimators can be employed in fiber optic components for broaden applications without being limited by the reliability problems of the collimators as that encountered in the prior art.

Another object of the present invention is to provide a simplified and cost effective method for cleaning the surface of the fiber pigtail and GRIN lens assembly. An electrical surface discharge treatment is applied to achieve clear and better-prepared surface. Stronger and more reliable bonding of the heat-curing epoxy between the GRIN lens and the pigtail is achieved. Final products of the collimator with significant improvement in performance reliability are also achieved.

Another object of the present invention is to provide a new design to fix a dual-fiber optical collimator to a stainless steel holder to produce more reliable collimators. The epoxy bond between the fiber pigtail and the GRIN lens is no longer in contact with the stainless steel holder and is also away from the soldering area. The collimators produced by the improved design can have better resistance to soldering.

Briefly, in a preferred embodiment, the present invention discloses a method to--fabricate an improved dual-fiber optical collimator. The method includes the steps of a) adjusting the position of a GRIN lens relative to a dual fiber pigtail on an alignment stage to achieve a lowest transmission loss; b) temporarily fixing the fiber pigtail and the GRIN lens at the optimal position by applying an ultraviolet epoxy around the boundary between the fiber pigtail and the GRIN lens; c) cleaning and activating all surface areas of the GRIN lens and pigtail by applying an electrical discharge surface treatment; d) permanently fixing the fiber pigtail to the GRIN lens by applying a heat-curing epoxy; e) permanently fixing the fiber pigtail to a glass tube by applying a heat-curing epoxy; f) permanently fixing the glass tube to a stainless steel holder by applying a heat-curing epoxy.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

In the present invention, a heat-curing epoxy is used to replace the UV curing epoxy to fix the fiber pigtail to the GRIN lens as well as the fiber pigtail to the glass tube. Particularly, a 353ND heat-curing epoxy from Epoxy Technology Inc. in Billerica, Mass. is used. Compared with the UV curing epoxy commonly used by conventional collimator, e.g., ELC4481 from Electro-Lite Company in Danbury, Conn., the heat-curing 353ND epoxy is about two times stronger in bonding strength and has much better resistance to high temperature and humidity. This invention discloses a method to replace the UV curing epoxy by the heat-curing epoxy. In the present invention, a new design is also used to fix the collimator to the stainless steel holder, in which the epoxy bonding between the fiber pigtail and the GRIN lens is no longer in contact with the stainless steel holder and is also further away from it. This reduces significantly effects of soldering on the collimator. An improved method and system of design and manufacture of dual-fiber optical collimators is provided in this invention.

Figure 1:
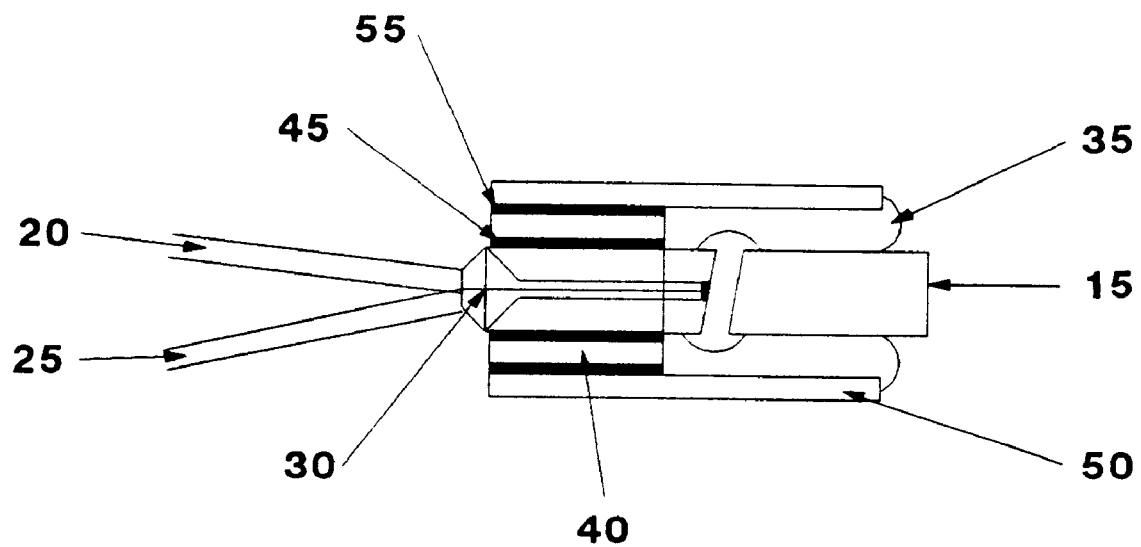
FIG. 1 is a cross sectional view of a conventional dual-fiber optical collimator.
Figure 2A:
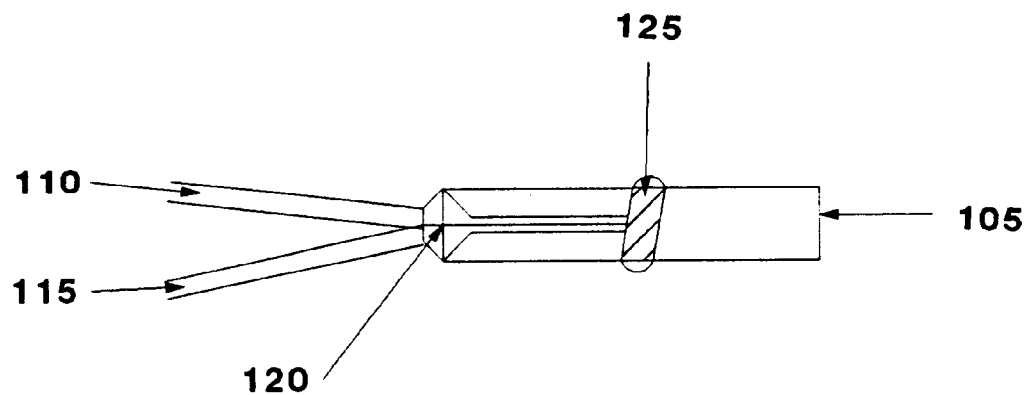
FIGS. 2A to 2E are a series of cross sectional views and top view for illustrating the fabrication processes of an improved dual-fiber optical collimator of this invention.

Please refer to FIGS. 2A to 2E for discussion of the materials employed and the fabrication processes applied to provide an improved dual-fiber collimator 100 of this invention. In FIG. 2A, a GRIN lens 105 and a dual fiber pigtail 120 are mounted on an alignment stage (not shown). Then a distance and orientation of the fiber pigtail 120 relative to the GRIN lens 105 is adjusted to achieve a lowest transmission loss from the input fiber 110 to the output fiber 115. After the fiber pigtail 120 is placed at its optimal position relative to the GRIN lens 105, a small drop of UV curing epoxy 125, e.g., OG154 epoxy from Epoxy Technology Inc. in Billerica, Mass. is applied. The UV curing epoxy 125 is applied in the gap between the GRIN lens 105 and the fiber pigtail 120. An ultraviolet curing is immediately carried out to cure the UV curing epoxy 125 such that the fiber pigtail 120 remains at its optimal position and the UV curing epoxy 125 just stays in the small outside boundary area of the gap and does not contaminate the optical signal transmission path. The purpose of the UV curing epoxy bonding 125 is to temporarily fix the fiber pigtail 120 at the optimal position relative to the GRIN lens 105. The curing process of the UV curing epoxy takes only few seconds. Once the UV curing process is completed, the whole lens-pigtail assembly can be removed from the alignment stage and the alignment stage can be freed to perform the adjustment operation for next collimators. The use of the UV curing epoxy greatly speeds up the production process and lowers the cost. The UV curing epoxy bonding 125 is also formed to protect the 353ND epoxy from contaminating the optical signal transmission path.

Figure 2B:
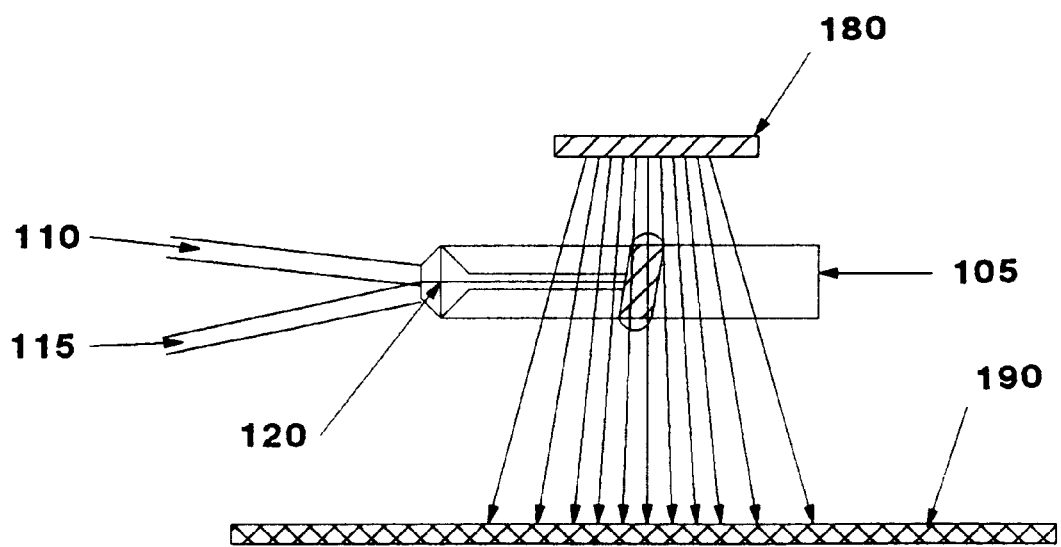

Referring to FIG. 2B, the assembly of the GRIN lens 105 and the fiber pigtail 120 is removed from the alignment stage. An electrical surface treatment is then applied to clean and activate the surfaces of the fiber pigtail 120 and the GRIN lens 105, which are often contaminated due to the handling processes. In addition, oxidation layer may also be formed on the surfaces of the fiber pigtail 120 and the GRIN lens 105. Chemical cleaning processes by applying solvent such as acetone cannot fully remove the contaminants and the oxidation layers. An unclean surface condition and an overlying oxidized thin film may lead to poor surface wettability and less effective bonding when a heat-curing epoxy is applied. Thus, a bench-top made by Laboratory System II from Tantec Company in Schaumburg, Ill. is used to carry out the cleaning process. The pigtail-lens assembly is placed between the discharge electrode 180 and the treatment table 190 and treated for 10 to 15 seconds. The electrical discharge surface treatment provides effective surface cleaning operation without affecting the bulk material properties. By applying a surface discharge treatment, the surfaces of the fiber pigtail 120 and the GRIN lens 105 are well cleaned and then activated when the surface energy is increased.

Figure 2C:
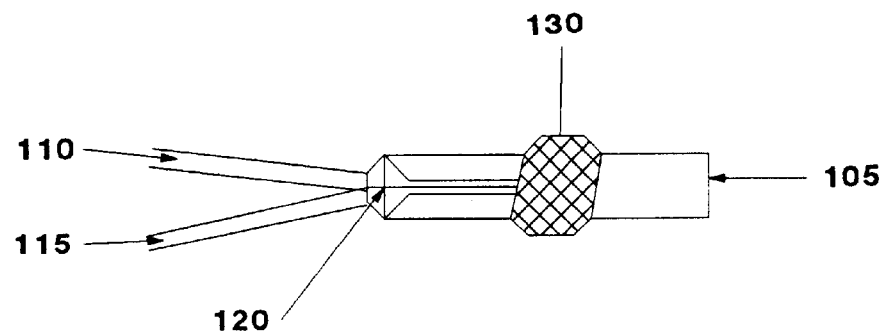
Figure 2D:
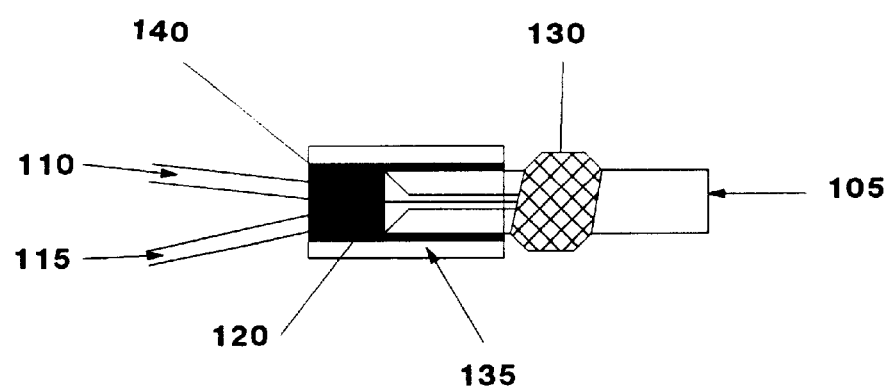
Figure 2E:
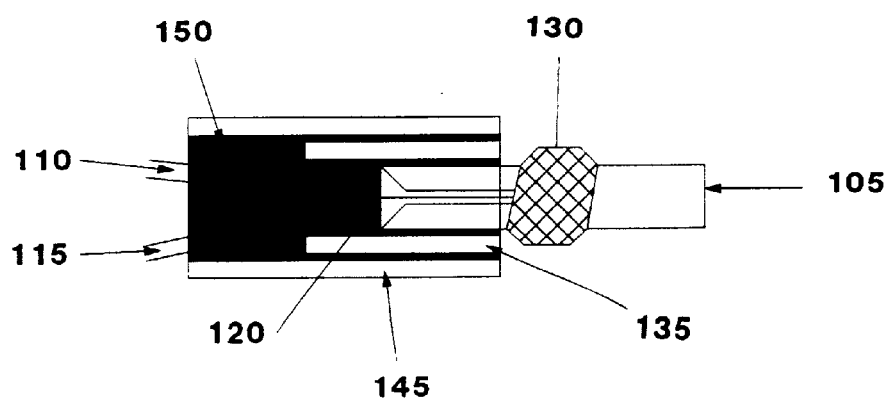

Referring to FIG. 2C, after the fiber pigtail 120 and the GRIN lens 105 are cleaned and activated by the surface discharge treatment, the 353ND epoxy 130 is applied to permanently fix the fiber pigtail 120 to the GRIN lens 105. The bonding between the fiber pigtail 120 and the GRIN lens 105 is significantly increased. The bonding strength improvement can be 100 to 200%. Referring further to FIG. 2D where the fiber pigtail 120 is fixed to a glass tube 135 by applying a heat-curing epoxy 140, such as the 353ND epoxy. Referring further to FIG. 2E where the glass tube 135 is fixed to a stainless steel holder 145 by applying a heat-curing epoxy 150, such as the 353ND epoxy. Heating the assembly at a temperature of about 85° C. for about an hour is carried out to cure the heat-curing epoxy. In the present invention, the epoxy bonding 125 and 130 are no longer in contact with the stainless steel holder 145. In addition, the epoxy bonding 125 and 130 are further away from the stainless steel holder 145. Thus, possible deformation of the epoxy bonding 125 and 130 due to soldering is greatly reduced. The finished product is manufactured where the GRIN lens 105 is securely attached to the fiber pigtail 120, and the fiber pigtail 120 is securely attached to the glass tube 135.

Figure 3:
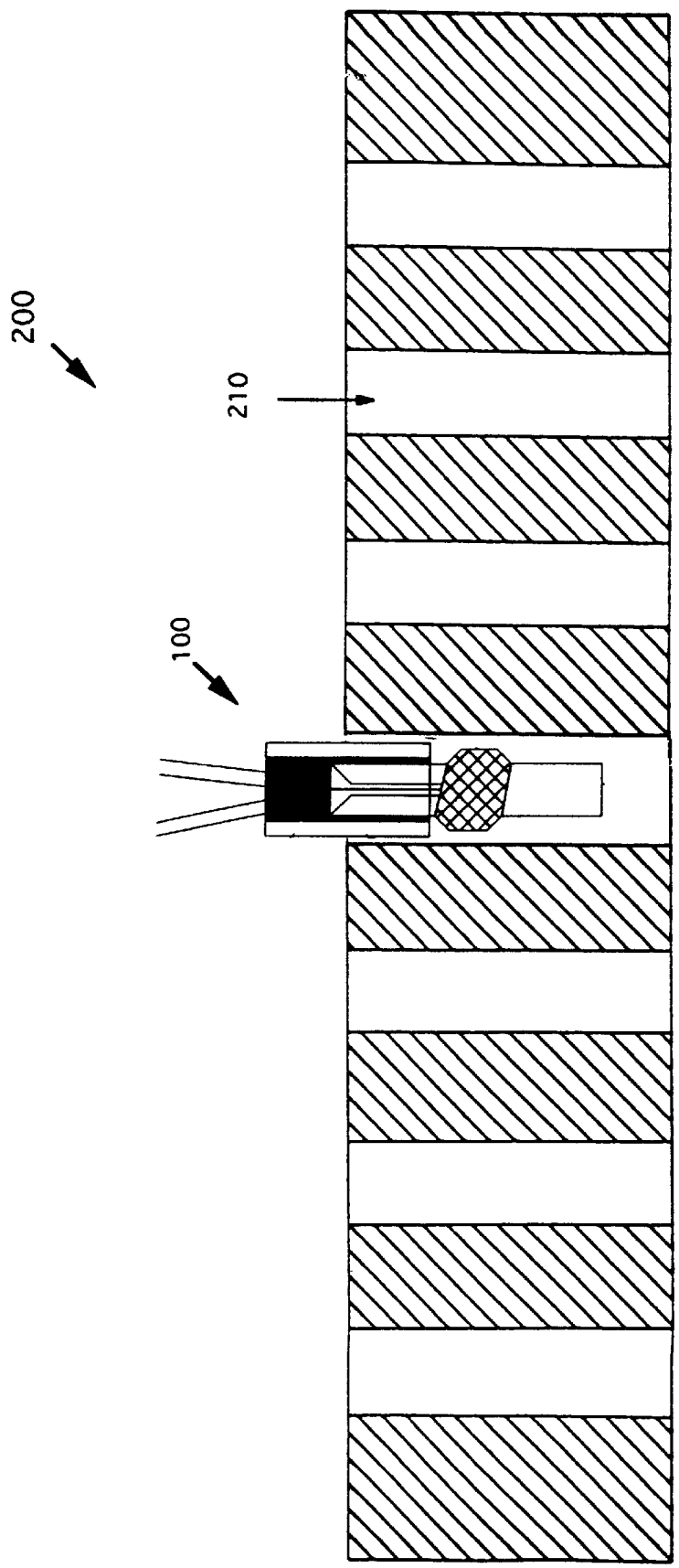
FIG. 3 is a cross sectional view of a heat-curing apparatus includes a plurality of elongated heat-curing chambers.

Referring to FIG. 3, the dual fiber optical collimator 100 is inserted into an elongate heat-curing chamber 210 of a heat-curing apparatus 200 either before (FIG. 2D) or after the stainless steel holder 145 is attached to carry out a heat-curing process. The heat-curing apparatus includes a plurality of elongated heat-curing chambers for simultaneously heating a plurality of fiber optical collimators. The heat-curing apparatus further includes a temperature control means (not shown) for heating and curing the optical collimators in the elongated heat-curing chambers. The temperature is controlled between a temperature range of 50–150° C. The strength of the bonding of the heat-curing epoxy 135 and 145 now provides stronger and more durable and permanent attachment Furthermore, the new design for fixing the glass tube 135 to the stainless steel holder 145 provides better resistance to soldering. The reliability of the collimators is significant improved.

According to FIGS. 2A to 2E and the above descriptions, this invention discloses a method of manufacturing a dual fiber optical collimator. The manufacture method comprises steps of a) adjusting a relative position of a dual fiber pigtail 120 to a GRIN lens 105 on an alignment stage to an optimal position achieving a lowest transmission loss; b) temporarily fixing the fiber pigtail 120 to the GRIN lens 105 at the optimal position by applying an ultra violet-curing epoxy 130 between the fiber pigtail 120 and the GRIN lens 105; c) cleaning and activating all surface areas of the GRIN lens 105 and the pigtail 120 by applying an electrical discharge surface treatment, d) permanently fixing the fiber pigtail 120 to the GRIN lens 105 by applying a heat-curing epoxy 130 thus forming a first heat-curing bonding epoxy; e) permanently fixing the fiber pigtail 120 to a glass tube 135 by applying a heat-curing epoxy 140 thus forming a second heat-curing bonding epoxy; and f) permanently fixing the glass tube 135 to a stainless steel holder 145 by applying a heat-curing epoxy 150 thus forming a third heat-curing bonding epoxy. In a preferred embodiment, the method further includes a step of g) heating the first, second and third heat-curing bonding epoxy at a temperature of about 85° C. for about an hour to cure the first, second and third heat-curing bonding epoxy. In a preferred embodiment, the steps d), e) and f) of applying a heat-curing epoxy is a step of applying a heat-curing epoxy of 353ND epoxy. In another preferred embodiment, the step b) of temporarily fixing the fiber pigtail 120 to the GRIN lens 105 at the optimal position by applying an ultraviolet-curing epoxy 125 between the fiber pigtail 120 and the GRIN lens 105 is a step of applying an OG154 epoxy. In another preferred embodiment, the step b) of temporarily fixing the fiber pigtail 120 to the GRIN lens 105 at the optimal position by applying an ultraviolet-curing epoxy 125 between the fiber pigtail 120 and the GRIN lens 105 is a step of applying an ECL4481 epoxy. In another preferred embodiment, the step c) of cleaning and activating all surface areas of the GRIN lens 105 and the pigtail 120 by applying an electrical discharge surface treatment is a step of employing a bench-top Laboratory System II of Tantec Company for cleaning and activating all surface areas of the GRIN lens 105 and the pigtail 120. In another preferred embodiment, the step f) of permanently fixing the glass tube 135 to a stainless steel holder 145 by applying a heat-curing epoxy is a step of placing the stainless steel holder 145 a distance away from the first heat-curing bonding epoxy 130 and the ultraviolet-curing epoxy 125. In another preferred embodiment, the step g) of heating the first, second and third heat-curing bonding epoxy at a temperature of about 85° C. for about an hour is a step of inserting the collimator into an elongated heat curing chamber of a heat-curing apparatus for heating the optical collimator therein. In another preferred embodiment, the step g) of heating the first, second and third heat-curing bonding epoxy at a temperature of about 85° C. for about an hour is a step of inserting the collimator into an elongated heat curing chamber of a heat-curing apparatus comprising a plurality elongated heat-curing chamber for heating a plurality of optical collimators simultaneously in the heat-curing chambers.

According to the drawings and above description, this invention further discloses a dual-fiber optical collimator 100. The collimator includes a dual fiber pigtail 120 and a GRIN lens 105 wherein the dual fiber pigtail 120 securely fixed to the GRIN lens 105 by an ultraviolet-curing epoxy 125 and a first heat-curing bonding epoxy 130. In a preferred embodiment, the collimator further includes a glass tube 135 securely fixed to the dual fiber pigtail 120 by a second heat-curing bonding epoxy 140. In another preferred embodiment, the collimator further includes a stainless steel holder 145 securely fixed to the glass tube 135 by a third heat-curing bonding epoxy 150. In a preferred embodiment, the first, second and third heat-curing bonding epoxy comprising a heat-curing epoxy of 353ND epoxy. In another preferred embodiment, the ultraviolet-curing epoxy 125 between the GRIN lens 105 and the dual fiber pigtail 120 is an ultraviolet-curing epoxy 125 of ECL4481 epoxy. In another preferred embodiment, the ultraviolet-curing epoxy 125 between the GRIN lens 105 and the dual fiber pigtail 120 is an ultraviolet-curing epoxy 125 of OG154 epoxy. In another preferred embodiment, the stainless steel holder 145 securely fixed to the glass tube 135 by a third heat-curing bonding epoxy 150 is disposed a distance away from the first heat-curing bonding epoxy 130 and the ultraviolet-curing epoxy 125.

According to FIG. 3, this invention further discloses a heat-curing apparatus 200, which includes a plurality of elongated heat curing chambers 210 each for receiving a dual-fiber optical collimator 100 therein for performing a heat-curing process in the elongated heat curing chambers. In a preferred embodiment, the heat-curing apparatus 200 further includes a temperature control means for controlling a temperature in each of the plurality of elongated heat curing chambers for performing a heat-curing process. In another preferred embodiment, the temperature control means is provided for controlling a temperature in each of the plurality of elongated heat curing chambers 210 for performing a heat-curing process in a temperature between 50 to 150° Celsius.

Therefore, the present invention discloses a new design and process for fabricating a dual-fiber optic collimator with improved reliability capable of sustaining prolong operation cycles in high temperature and high humidity environment without breakdown as well as having good resistance to soldering. The difficulties and limitations in the prior art are overcome. Specifically, this invention discloses a fabrication process to first adjust and fix the position of a fiber pigtail relative to a GRIN lens then apply a heat-curing epoxy to produce more reliable collimators. The collimators produced by the improved processes can sustain long term operation under high temperature and high humidity conditions. Therefore, the improved collimators can be employed in fiber optic components for broaden applications without being limited by the reliability problems of the collimators as that encountered in the prior art. Also, the present invention discloses a simplified and cost effective method for cleaning the surface of the fiber pigtail and GRIN lens assembly. An electrical surface discharge treatment is applied to achieve clear and better-prepared surface. Stronger and more reliable bonding of the heat-curing epoxy between the GRIN lens and the fiber pigtail is achieved. Furthermore, a new design is used to fix the collimator to the stainless steel holder. Effects of soldering on the collimator are reduced. Final products of the collimator with significant improvement in performance reliability are also achieved. Additionally, this invention discloses a more reliable adhesive and attachment layer to secure and seal the fiber pigtail to the GRIN lens of a collimator without being limited by another requirement that the fiber pigtail has to remain in a fixed position. A temporary-fixing layer by employing an ultraviolet epoxy is formed before a permanent more reliable sealing and attaching layer is formed without changing the fixed position of the pigtail. The limitation imposed by keeping the collimator on the alignment stage for keeping the fiber pigtail in the fixed position is therefore circumvented.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A dual-fiber optical collimator comprising:

a dual fiber pigtail and a GRIN lens wherein said dual fiber pigtail securely fixed to said GRIN lens by an ultraviolet-curing epoxy and a first heat-curing bonding epoxy.

2. The dual-fiber optical collimator of claim 1 further comprising:

a glass tube securely fixed to said dual fiber pigtail by a second heat-curing bonding epoxy.

3. The dual-fiber optical collimator of claim 2 further comprising:

a stainless steel holder securely fixed to said glass tube by a third heat-curing bonding epoxy.

4. The dual-fiber optical collimator of claim 3 wherein:

said first, second and third heat-curing bonding epoxy comprising a heat-curing epoxy of 353ND epoxy.

5. The dual-fiber optical collimator of claim 3 wherein:

said ultraviolet-curing epoxy between said GRIN lens and said dual fiber pigtail is an ultraviolet-curing epoxy of ECL4481 epoxy.

6. The dual-fiber optical collimator of claim 3 wherein:

said ultraviolet-curing epoxy between said GRIN lens and said dual fiber pigtail is an ultraviolet-curing epoxy of OG154 epoxy.

7. The dual-fiber optical collimator of claim 3 wherein:

said stainless steel holder securely fixed to said glass tube by a third heat-curing bonding epoxy is disposed a distance away from said first heat-curing bonding epoxy and said ultraviolet-curing epoxy.

* * * * *